No. 659,562. Patented Oct. 9, 1900.
M. WELKEE.
DINNER PAIL.
(Application filed May 8, 1900.)
(No Model.)

WITNESSES:
James F. Duhamel
L. B. Owens

INVENTOR
May Welkee.
BY 
ATTORNEYS.

UNITED STATES PATENT OFFICE.

MAY WELKEE, OF OAKLAND, CALIFORNIA.

DINNER-PAIL.

SPECIFICATION forming part of Letters Patent No. 659,562, dated October 9, 1900.

Application filed May 8, 1900. Serial No. 15,899. (No model.)

*To all whom it may concern:*

Be it known that I, MAY WELKEE, a citizen of the United States, and a resident of Oakland, in the county of Alameda and State of California, have invented a new and Improved Dinner-Pail, of which the following is a full, clear, and exact description.

This invention relates to a device for carrying food and for permitting the food to be heated conveniently when it is to be eaten, to which end I provide a pail or bucket with a detachable bottom section carrying a heating device, preferably an alcohol-lamp, and within the pail is placed a water-pan to be heated by the lamp, over which pan is arranged the vessel carrying the food, and in the top of the pail is placed a vessel comprising one or more compartments for carrying liquids.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1:
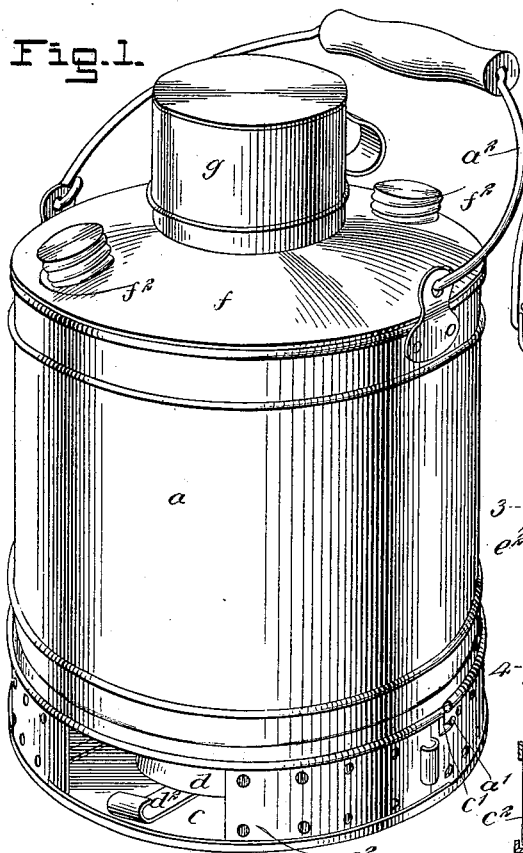
Figure 2:
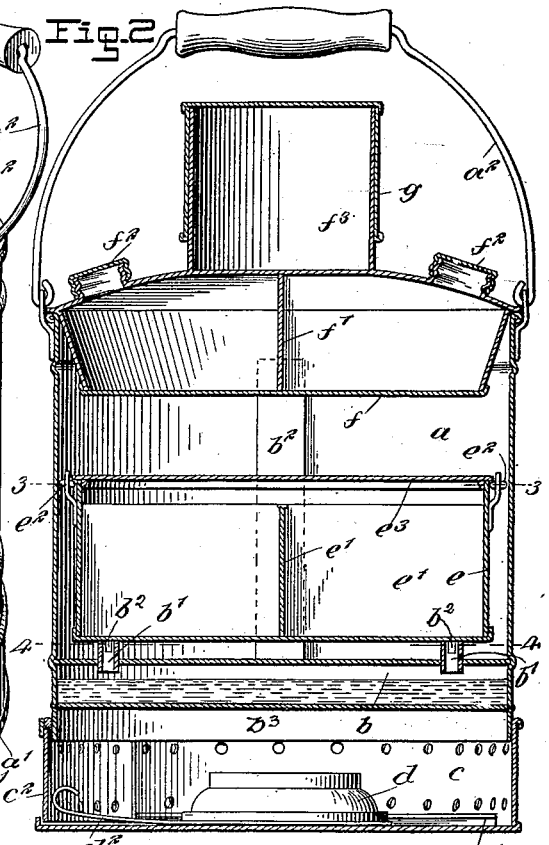
Figure 3:
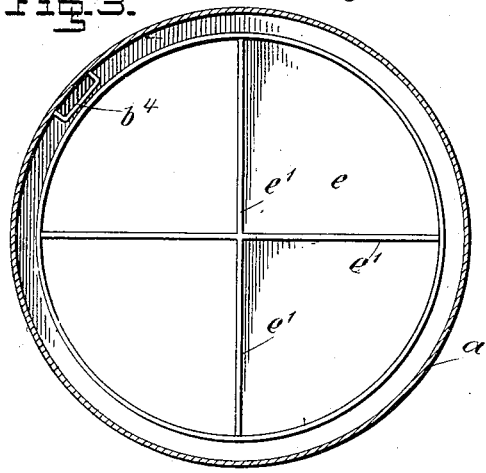
Figure 4:
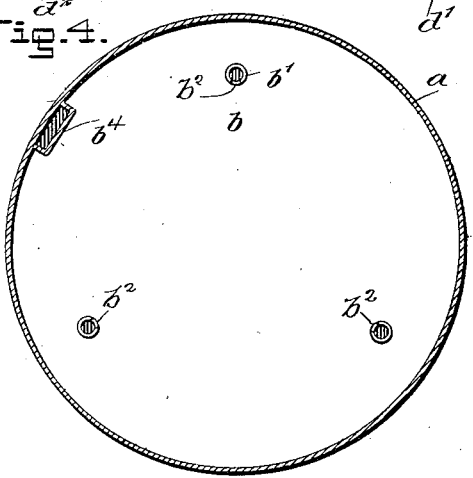
Figure 4:

Figure 1 is a perspective view of the invention. Fig. 2 is a vertical section thereof. Fig. 3 is a horizontal section on the line 3 3 of Fig. 2, and Fig. 4 is a horizontal section on the line 4 4 of Fig. 2.

The body $a$ has a vessel $b$ formed in the bottom thereof, through the top of which vessel pass tubes $b'$, serving to carry the steam generated in the vessel upward into the body of the pail. The tubes $b'$ are provided just below their upper ends with openings $b^2$ for the lateral escape of steam. It will be noticed that I provide the tubes $b'$ in a series of at least three, so they will form a steady support for the food-receptacle $c$ and will also distribute the steam to the under side of said receptacle.

It will be noticed that I arrange the tubes $b'$ on opposite sides of the center of the food-receptacle, so that the latter will be supported firmly and evenly above the said tubes and will not be tilted from side to side. This is important, as it secures the even distribution of the steam or other vapor to the under side of the food-receptacle and avoids any tilting of the food-receptacle which would tend to direct the vapor to the higher side of the food-receptacle, as will be readily understood.

The lower end of the body $a$ is provided with one or more pins $a'$, which work in bayonet-slots $c'$, formed on a bottom section $c$, which is removably attached to the body $a$ of the device by means of the pins $a'$, as explained. This bottom section $c$ carries an alcohol-lamp or other heating device $d$, which is arranged to move in slideways $d'$ on the bottom of the section $c$. The lamp $d$ has a handle $d^2$, by which it may be moved, and the bottom section $c$ has a sliding door $c^2$ arranged in the immediate vicinity of the handle $d^2$, so that by opening this door the handle $d^2$ may be grasped and the lamp $d$ moved into position to be lighted or extinguished, as desired. It is therefore unnecessary to disconnect the bottom section $c$ from the body $a$ of the device except when the lamp is to be filled or cleaned. Below the vessel $b$ the body $a$ of the pail is formed with perforations to permit of combustion within the bottom section $c$, and the door $c^2$ also may be opened or closed to regulate the quantity of atmospheric air admitted to the section $c$. The chamber $b$ may be supplied with water by a tube $b^4$, which is arranged rigidly on the inner side of the body $a$ of the pail and opens at its outer end just below the upper end of the body of the pail, and by means of a suitable funnel or other device the water may be poured through this tube into the vessel $b$.

Carried within the pail and normally sustained on the tubes $b'$ of the vessel $b$ is a food-receptacle $e$, which has a number of partitions $e'$ therein dividing it into separate compartments for various kinds of food. This food-receptacle $e$ may be provided with a bail $e^2$ for handling it, if desired, and also with a lid or cover $e^3$, as shown. The top or closure of the pail is formed by a vessel $f$, which is fitted with a partition $f'$, dividing it into two compartments. Two closures $f^2$ are respectively provided for these compartments, and in the compartments of this vessel liquids—such as coffee, water, or the like—may be carried. A sleeve or other projecting member $f^3$ is carried on the top of the vessel $f$, and this serves to sustain a drinking-cup $g$. Other articles may be placed within the sleeve $f^3$, if desired. For example, this sleeve may be used to carry the funnel for use in connection with the tube $b^4$, referred to before. The pail has a suitable handle $a^2$, by which it may be carried. It will be seen that by this arrangement the person using the device may carry food of various sorts, and by the use of the lamp the food may be heated whenever desired. The steam generated within the vessel $b$ passes up into the body $a$ of the pail and not only heats the food-receptacle $e$, but also the liquid vessel or container $f$. It will also be observed that space is provided between the parts $e$ and $f$, in which may be received a plate, knife and fork, and other implements for the convenience of the person using the invention.

As before suggested, I make the lamp-carrying section detachable or separable from the body of the pail, so the lamp-section can be readily removed for cleansing or other purposes, and it also enables the body of the pail to be used without the lamp-section when desired. In this use of the device the depending flange or rim $b^3$, which extends below the bottom of the water-receiver, forms a base for the pan and also provides a convenient support for the pins $a'$ of the bayonet-joint, as will be understood from Figs. 1 and 2.

Having thus described my invention, I claim as new and desire to secure by Letters Patent—

A dinner-pail comprising the body-section provided near its bottom with the water vessel, the steam-outlet tubes projecting above said water vessel and having lateral discharge-openings, and arranged in series of not less than three, such tubes being located on opposite sides of the center of the water vessel, and the food-receptacle resting upon the several said outlet-tubes, all substantially as described, whereby the food-receptacle will be firmly supported without any tendency to tilt from side to side, whereby to secure an even distribution of the steam below the food-receptacle, and to support the receptacle without endangering its bottom by its contact with the steam-outlet tubes, as and for the purpose specified.

In testimony whereof I have signed my name to this specification in the presence of two subscribing witnesses.

MAY WELKEE.

Witnesses:
M. ROSE PERRY,
HERBERT H. WINSLOW.